(12) United States Patent  
Mackiewicz

(10) Patent No.: US 7,303,242 B1  
(45) Date of Patent: Dec. 4, 2007

(54) FAST FILL BRAKE SYSTEM

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 241 days.

(21) Appl. No.: 11/162,962

(22) Filed: Sep. 29, 2005

(51) Int. Cl.  
*B60T 8/42* (2006.01)

(52) U.S. Cl. ............................ 303/115.2; 303/DIG. 11; 303/113.1

(58) Field of Classification Search ............. 303/115.1, 303/115.2, DIG. 11, 113.1; 138/30, 31; 60/413, 60/418  
See application file for complete search history.

(56) References Cited

U.S. PATENT DOCUMENTS

| | | | | |
|---|---|---|---|---|
| 5,288,142 A | * | 2/1994 | Burgdorf | 303/DIG. 11 |
| 5,411,326 A | * | 5/1995 | Linhoff | 303/116.2 |
| 6,149,249 A | * | 11/2000 | Matsuda | 303/115.2 |
| 6,234,128 B1 | * | 5/2001 | Reuss | 123/179.17 |

\* cited by examiner

*Primary Examiner*—Thomas Williams  
(74) *Attorney, Agent, or Firm*—Leo H. McCormick, Jr.; Sarah Taylor

(57) ABSTRACT

An adaptation to a vehicle antilock braking system modulator to increase the initial displacement of the master cylinder, provide quicker system response and improved pedal feel. A solenoid assembly is added to the non fluid side of each of the low pressure accumulators in the ABS modulator. Upon the operator initiation of a brake apply, the solenoids are energized to immediately push upon the sump pistons and inject fluid from the low pressure accumulators into the brake system. This extra "shot" of fluid decreases the amount of fluid that the master cylinder delivers to the brake system. This improves pedal feel as it reduces the required initial pedal travel for a given brake system displacement. The low pressure accumulator pistons are spring balanced to ensure retention of fluid between brake applies and to allow normal ABS operation. During ABS operation, the low pressure accumulator displacer solenoids are de-energized to allow effective operation. The holding force (electrical current) of the displacer solenoids can be reduced by using a toggle linkage apply mechanism.

19 Claims, 5 Drawing Sheets

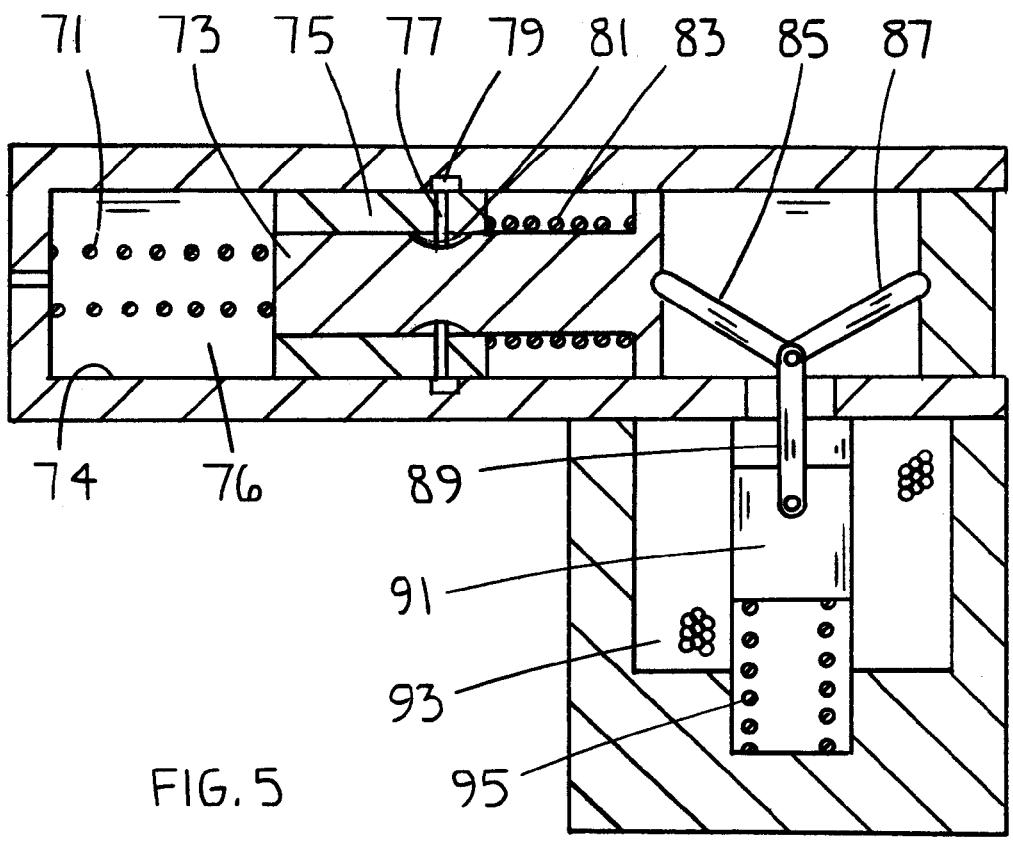
FIG. 5
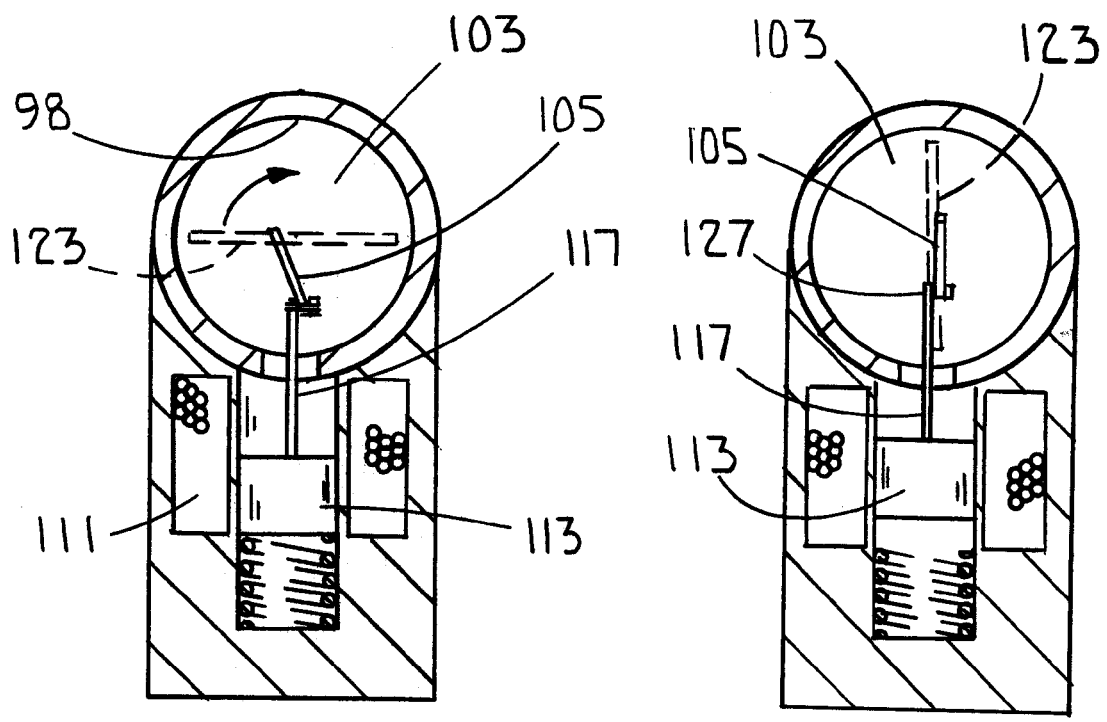
FIG. 8A
FIG. 8B

FAST FILL BRAKE SYSTEM

BACKGROUND OF THE INVENTION

The present invention relates generally to a power assisted braking system for a vehicle and more particularly to methods and apparatus for providing optimal pedal feel and improved time response for a braking system having, for example, an antilock feature. At the beginning of a brake apply, the fluid displaced out of the master cylinder is used to bring the brake friction material in contact with the brake rotors or drums. This take-up of running clearances is basically lost travel from a pedal feel standpoint. The goal of this invention is to reduce this initial pedal travel and thus to improve pedal feel.

It is desirable to decrease brake response time from a safety viewpoint and desirable to improve the feel of the brake pedal to the vehicle operator from an ergonomic viewpoint. Many known antilock devices operate by cyclically increasing and decreasing a braking force exerted on the wheels so that a slipping wheel having a tendency to lock is permitted to re-accelerate back to a speed corresponding to the speed of the vehicle. This is typically achieved by control valves alternately allowing fluid to flow out of and then into a brake cylinder to first lower and then raise the brake pressure in the brake system. Typically antilock braking systems utilize either a so-called pump-back scheme or a replenish scheme during a reapply or build operational sequence to maintain a desired level of hydraulic fluid in a brake system. In a pump-back scheme, the same hydraulic fluid is re-supplied from a local low pressure accumulator to the brake pad actuators while in a replenish scheme hydraulic fluid comes from a separate source such as either a hydraulic accumulator or a separate pump and motor. Most of such antilock braking systems are further capable of operating in a traction control function. A traction control function is established by detecting conditions where the rotational speed of a first powered wheel substantially exceeds that of a second powered wheel. To provide a power balance in the operation of a vehicle, a braking force is applied to the powered wheel rotating at a higher speed effectively transferring driving torque back to that wheel with better traction. Many antilock systems having such a traction control feature employ a motor and hydraulic pump or pumps along with fluid accumulators which operate somewhat independently of the service braking system.

SUMMARY OF THE INVENTION

The present invention provides the desirable pedal feel and brake response time by using the existing low pressure accumulator bore and piston in the antilock braking system (ABS) in an expanded role of providing a means to fast fill the brake system upon the initiation of a brake apply. To accomplish this additional function of fast fill, a solenoid is added to push the existing low pressure accumulator piston down the bore and displace fluid into the brake system. The solenoid is enabled or energized upon the initiation of a brake apply. Three specific constructions that fulfill the desired goals while maintaining the original ABS functionality of the low pressure accumulator are disclosed. The function of the low pressure accumulator is to accept and temporarily store and return to the system the prescribed decay fluid.

The invention comprises, in one form thereof, a brake fluid accumulator for a vehicle braking system which is operable in a passive mode to receive fluid from and return fluid to the vehicle braking system, and operable in an active mode to supply an initial shot of pressurized fluid to the vehicle braking system upon initial operator actuation of the braking system. The accumulator has a housing with a cylindrical bore and a piston assembly reciprocably disposed therein to define a variable volume chamber. The chamber has an inlet for receiving pressure fluid from the vehicle braking system and for expelling pressure fluid from the chamber to the vehicle braking system along with a resilient spring which biases the piston assembly in a direction to diminish the chamber volume. A solenoid has an armature reciprocable along a solenoid axis disposed generally orthogonally to the bore axis in response to solenoid energization and there is a mechanical coupling in the form of a toggle linkage mechanism between the solenoid armature and the piston assembly operable to transmit armature motion induced by solenoid energization to the piston assembly expelling pressure fluid from the chamber to the vehicle braking system.

An advantage of the present invention is reduced brake response time.

Another advantage is the reduced initial brake pedal travel and resulting more responsive feel of the brake pedal to a vehicle operator.

Yet another advantage of the present invention is the capability of the solenoid to maintain the displacement of the fast fill fluid in the brake system under high system pressure without significant force and resulting electrical current demand upon the solenoid.

BRIEF DESCRIPTION OF THE DRAWINGS

FIG. 5 is a cross-sectional view of a toggle with pin lock variation on a solenoid powered accumulator suitable for use in the circuit of FIG. 1 in its quiescent state;

FIG. 8a is a cross-sectional view of the solenoid powered accumulator of FIG. 6 along the lines 8-8 of FIG. 6; and FIG. 8b is also a cross-sectional view of the solenoid powered accumulator of FIG. 6 along the lines 8-8 of FIG. 6, but showing the effect of solenoid energization.

Corresponding reference characters indicate corresponding parts throughout the several drawing views.

DETAILED DESCRIPTION OF THE INVENTION

Figure 1:
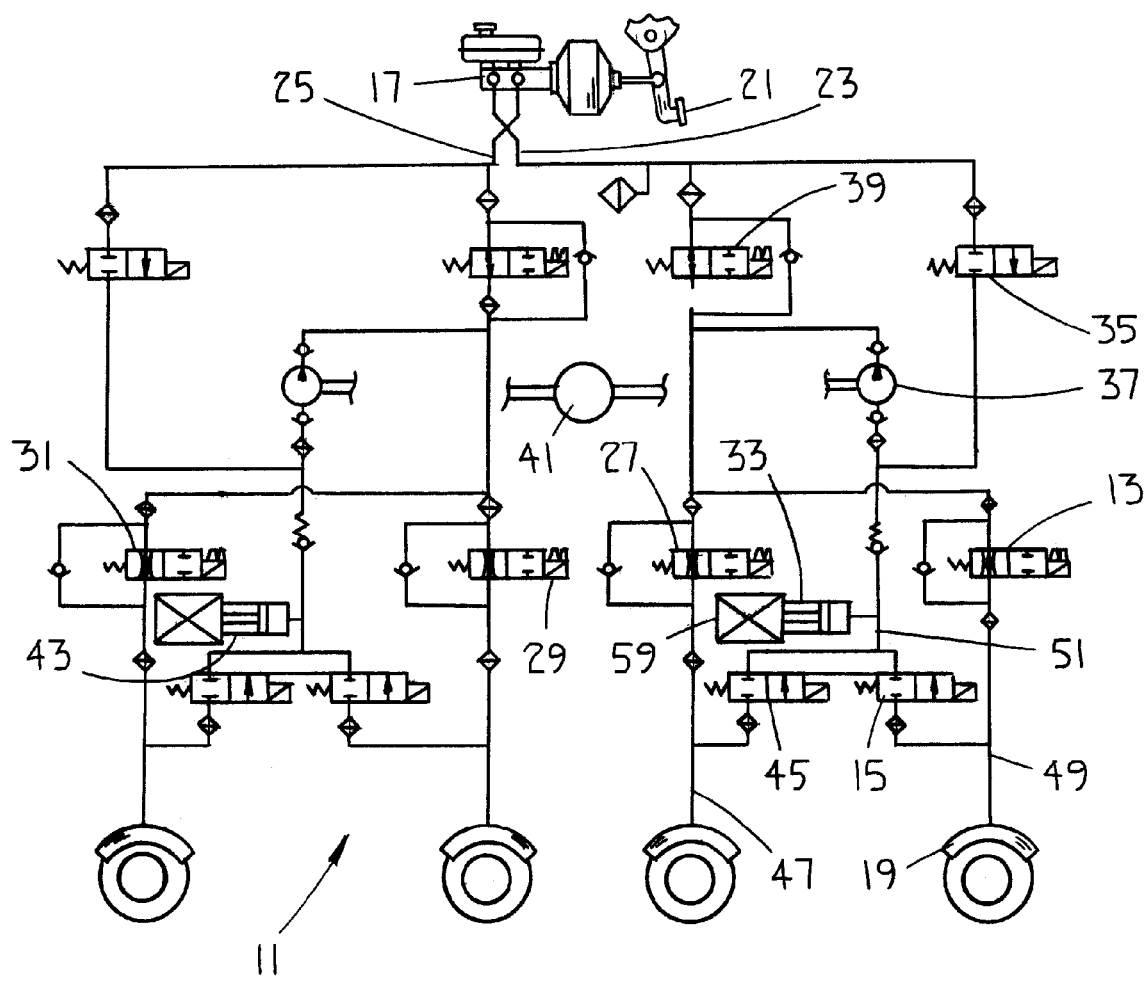
FIG. 1 is a schematic illustration of a portion of an antilock braking hydraulic circuit incorporating the invention in one form.

Referring now to the drawings and particularly to FIG. 1, there is shown an antilock hydraulic braking system 111 for use in a vehicle. The braking system includes solenoid actuated antilock valves 13 and 15 located between an operator controlled pressure source or master cylinder 17 and a hydraulic actuator for a rear wheel brake 19. Valve 13 functions as a build and hold valve while valve 15 functions as a decay valve. Similar antilock valves, e.g., 27 and 45, are provided for the other wheel brakes. Typically, the pressure source 17 is a conventional master cylinder having two separate circuits, one for the front vehicle wheel brakes and the other for the rear wheel brakes, or one for a left front and right rear and the other for a left rear and right front wheel brakes as illustrated in FIG. 1. The vehicle wheels also typically have rotational speed sensors for providing electrical indications of the angular velocities of individual wheels to a conventional antilock electronic control unit. When the driver wishes to slow the vehicle, the pedal 21 is depressed and hydraulic fluid pressure is transmitted from the master cylinder 17 by way of conduits (brake lines) 23 and 25 to the respective brake actuators by way of four individual solenoid actuated antilock valves 13, 27, 29 and 31. The individual wheel antilock valves such as 13 are normally open to selectively supply braking fluid pressure from the source 17 by way of line 23 and 25 to the individual brake actuators. Valves such as 13 and 15 function as build and hold valves supplying braking fluid pressure from either line 23 during normal braking or from the accumulator 33 during antilock or traction control operation.

In particular, FIG. 1 shows two substantially identical fluid circuits each having an accumulator such as 33, a pump 37, two normally closed outlet valves, 15 and 45, for example, for venting fluid from the wheel cylinders during antilock events and two normally open inlet valves such as 13 and 27 providing a brake fluid path to their corresponding wheel cylinders. The circuits may share a pump drive motor 41. The normally open solenoid actuated inlet valves 13 and 27 are located between an operator controlled pressure source such as the master cylinder 17 for supplying pressurized fluid to line 23 and hydraulic brake actuators which receive that pressurized fluid by way of lines 47 and 49.

If, during a braking event, a wheel skid is detected, say the right rear wheel associated with line 49, the solenoid of valve 13 is energized closing that valve and the outlet valve 15 is enabled to open the valve and vent fluid pressure from the slipping wheel cylinder by way of line 51 to the accumulator 33 and/or to a low pressure reservoir. Inlet valves 27, 29 and 31 function similarly. The inlet and outlet valves associated with the slipping wheel may be pulsed or otherwise controlled as is common in antilock braking technology. For example, periodically during the time hydraulic fluid is being bled from the brake actuator 19, valve 13 is opened to supply rebuild pressure. The primary function of the low pressure accumulators 33 and 43 is to absorb excess fluid during an ABS event. This excess fluid typically occurs for only brief periods and helps prevent wheel locking. The modification to the accumulators shown in detail in FIGS. 2-7 provide an additional fast fill benefit during normal braking.

Figure 6:
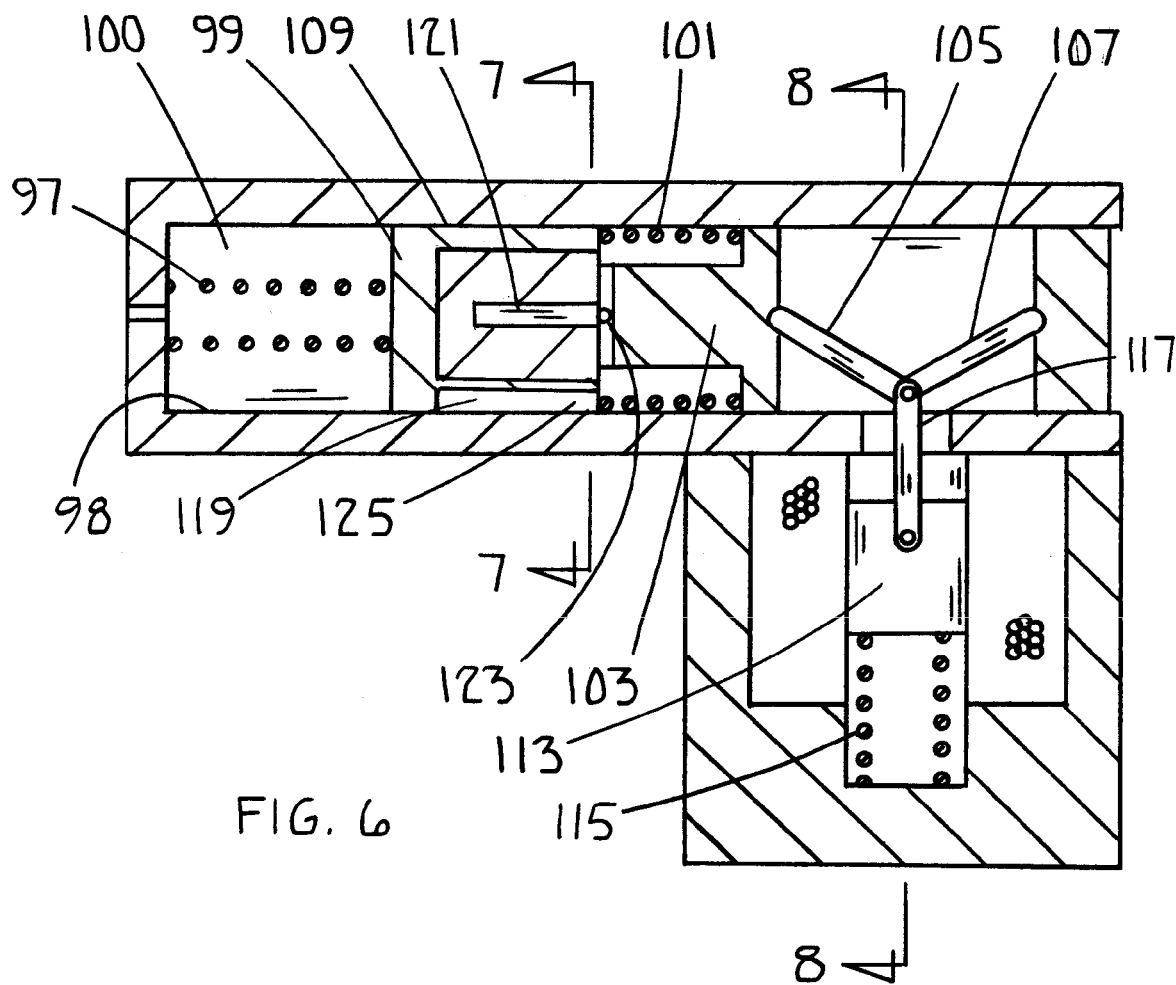
FIG. 6 is a cross-sectional view of a toggle with pin and cross lock-out variation on a solenoid powered accumulator suitable for use in the circuit of FIG. 1 in its quiescent state.
Figure 7:
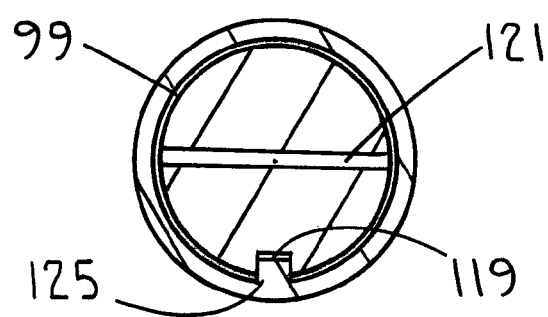
FIG. 7 is a cross-sectional view of the solenoid powered accumulator of FIG. 6 along the lines 7-7 of FIG. 6.

FIGS. 2-8 illustrate three illustrative ways in which a multiple function accumulator may be realized. The implementation of FIGS. 2-4 has a piston assembly comprising a single piston 53 reciprocable within the bore 52 and there is a mechanical coupling comprising a toggle linkage mechanism 65, 67, 69 interconnecting the piston and a solenoid armature 63 with the toggle arm 65 coupled to the piston. A piston spring 57 urges the piston in a direction to increase chamber 56 volume and an armature bias spring 61 urges the armature in a direction to oppose an increase in chamber volume so that a fluid ingress induced increase in chamber volume and piston translation is transmitted by the linkage to compress the armature bias spring, while a solenoid induced armature motion is transmitted by the linkage to the piston compressing the piston spring and expelling fluid from the chamber. In FIG. 5, the piston assembly comprises a generally cylindrical sleeve 75 disposed in the bore 74 and a reciprocable piston 73 coaxially received in the sleeve. The piston moves under urging of the armature while the sleeve remains stationary to expel pressure fluid from the chamber to the vehicle braking system, while only the sleeve moves when receiving pressure fluid from the system. In FIGS. 6-8, the piston assembly is reciprocable within the bore 98 along a bore axis and comprises a single piston 99 while the mechanical coupling comprises a toggle linkage mechanism 105, 107, 117 and a piston actuator 103 reciprocably disposed within the bore axially adjacent to the piston. The actuator and piston move together in response to armature movement, however, only the piston moves axially toward the actuator in response to a fluid ingress induced increase in chamber volume.

Figure 2:
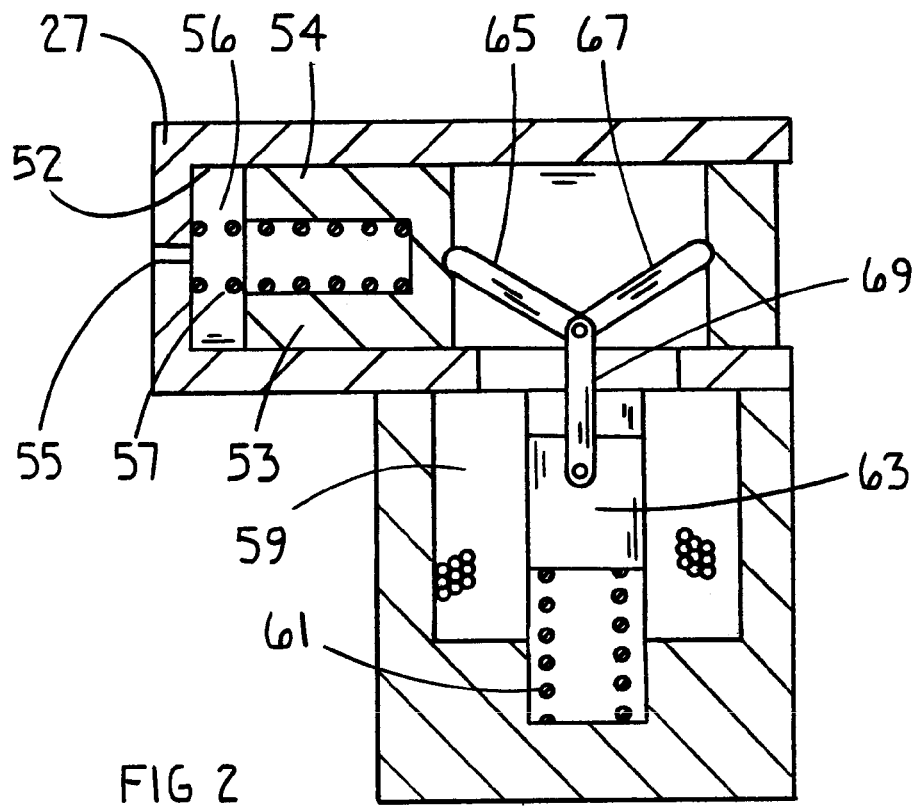
FIG. 2 is a cross-sectional view of an illustrative solenoid powered accumulator suitable for use in the circuit of FIG. 1 in its quiescent state.

More specifically, in FIG. 2, the ABS and fast fill fluidic functions are accomplished by a piston 53 which is reciprocable in a bore 52 with a seal 54 there between. The piston and bore together define a variable volume chamber 56. Piston 53 is coupled to a movable solenoid armature 63 by the pivotable linkages 65, 67 and 69. Piston 53 is resiliently biased toward the right as viewed by a helical spring 57 and the armature 63 is biased upwardly by another helical spring 61.

Figure 3:
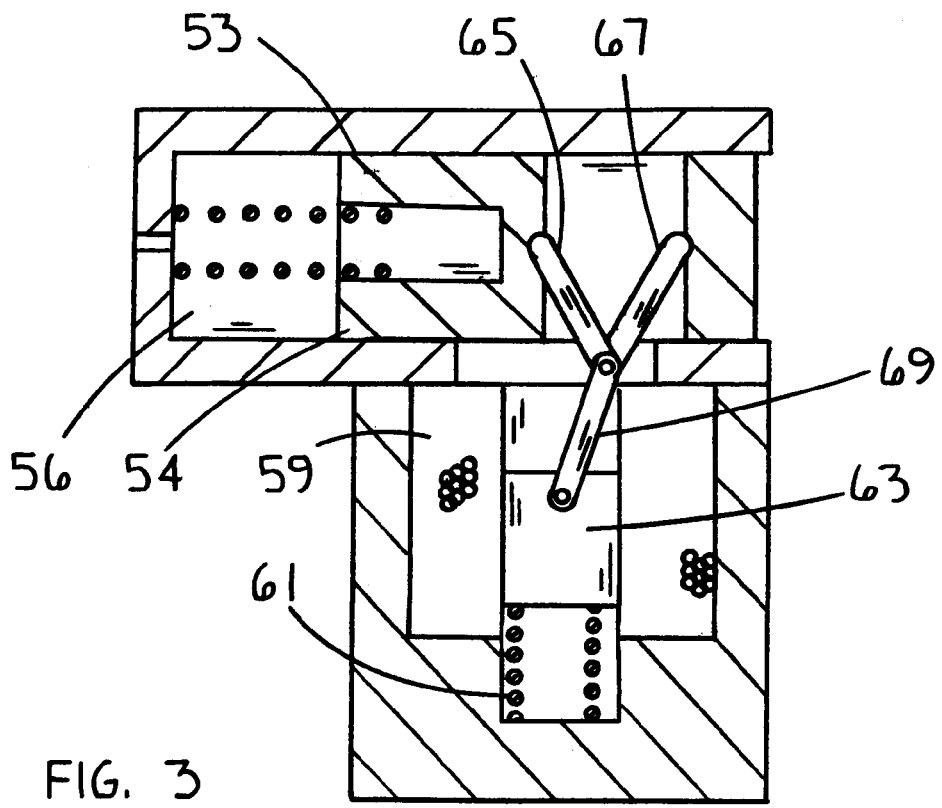
FIG. 3 is a cross-sectional view of the solenoid powered accumulator of FIG. 2 shown in the full stroke position.

The low pressure accumulator function is accomplished as fluid enters the chamber 56 from the left end at 55 and the spring 57 loaded piston 53 moves to the right toward the position shown in FIG. 3. This fluid acts against the toggle 65, 67, 69 and solenoid armature 63 in their normal at rest position, causing the solenoid armature 63 to be pushed back/down from its normal at rest position compressing spring 61 as seen in FIG. 3. This over retraction or stroke of the armature is provided for in the design of the solenoid assembly and is biased back to the at rest position by the spring 61 that represents the nominal force found in an ABS low pressure accumulator. The fast fill function is accomplished by energization of the solenoid 59 which causes the solenoid armature 63 to move upward, further causing, the toggle arms 65 and 67 to expand away from one another thus causing the piston 53 to move to the left fast displacing fluid out of the chamber 56 into the brake system (at rest position shown in FIG. 2). In the fast fill apply position (FIG. 4) of the toggle, the toggle angularity is geometrically favorable that high pressure acting upon the piston will not cause high forces on the solenoid armature. If the angle between the link 65, and the horizontal axis of the piston 53 and cylindrical bore 52 is á, then the solenoid force exerted directly upwardly Fs is related to the horizontal force Fp applied to the piston through link 65 by: Fs=2Fp tan á

Figure 4:
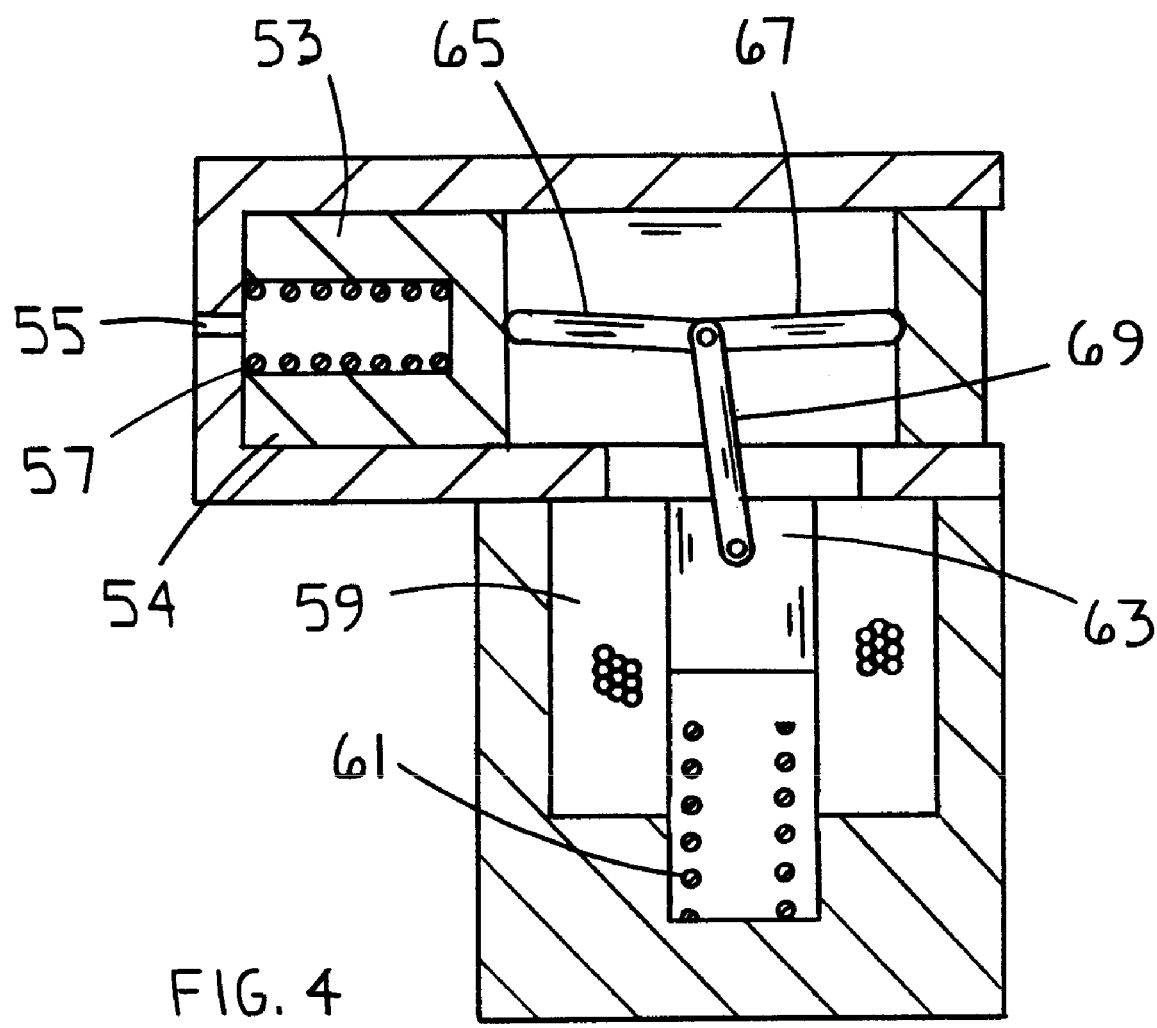
FIG. 4 is a cross-sectional view of the solenoid powered accumulator of FIG. 2 in the fast fill position.

As depicted, the angle between the link 65 and the horizontal axis of the piston 53 and cylindrical bore 52 is about ten degrees. Under that assumption, the holding force required of the solenoid 59 in FIG. 4 is only about 3.5% of the force applied to the hydraulic piston. For modestly small angles, the mechanical advantage (Fp/Fs) is substantially greater than one.

In FIG. 5, a piston 73 is reciprocably disposed within a sleeve 75 and that sleeve in turn is reciprocably disposed within a cylindrical bore 74. The piston 73 and sleeve 75 comprise a piston assembly, and the assembly and bore 74 together define a variable volume chamber 76. The piston is spring biased toward the right as viewed by a helical spring 71 and the piston and sleeve are spring biased away from one another by another helical spring 83. The sleeve carries one or more pins 77 which are movable radially inwardly into an annular piston groove 81 or radially outwardly into side wall detent notches such as 79. A pivotable linkage arrangement 85, 87, 89 couples the piston 73 to a solenoid 93 armature 91. Armature 91 is biased upwardly as viewed by a helical (coil) spring 95. When the solenoid 93 is unenergized, the springs 71, 83 and 95 balance the piston 73 and sleeve 75 in the positions illustrated in FIG. 5, but when that solenoid is enabled or energized, the armature 91 moves upwardly spreading the linkage arms 85 and 87 away from one another and urging the piston 73 toward the left. Piston motion displaces the groove 81 urging the pins such as 77 radially outwardly into the notches 79 locking the sleeve 75 in the position shown.

In the embodiment of FIG. 5, the ABS and fast fill fluidic functions are accomplished by the piston 73 and sleeve 75. The low pressure accumulator function is accomplished as fluid enters the chamber from the left end and the spring 83 loaded sleeve 75 moves to the right compressing spring 83. The fast fill function is accomplished by energization of the solenoid 93 which causes the solenoid armature 91 to move upward, causing, the toggle arms 85 and 87 to expand away from one another toward a straight angle relationship and pushing the piston 73 to the left, thus displacing fluid out of the chamber to the brake system. The sleeve 75 must be kept from moving to the right during this fast fill action to ensure adequate fast fill displacement. This is accomplished by the angled annulus 81 on the piston which causes spring loaded pins 77 to move outward into the recesses 79 in the bore, thus preventing movement of the sleeve 75. In the fast fill apply position of the toggle (at rest position shown in FIG. 5), the toggle angularity is geometrically favorable that high pressure acting upon the piston will not cause high forces on the solenoid armature. This toggle arrangement/position is much the same as seen in FIG. 4.

In FIG. 6, a coil spring 97 biases a piston 99 rightwardly within a cylindrical bore 98 with sealing there between provided by a seal 109. A piston assembly here as in FIGS. 2-4 comprises a single piston. The piston 99 and bore 98 define a variable volume chamber 100. A helical spring 101 resiliently biases the piston and an actuator 103 axially away from one another. Solenoid 111 includes a reciprocable armature 113 biased upwardly by coil spring 115. The armature is mechanically coupled to the actuator 103 by a linkage arrangement 105, 107, 117, however this toggle linkage mechanism functions somewhat differently than those shown in FIGS. 2-5.

The cross-section of FIG. 7 shows the alignment groove 119 which extends axially along the surface of the piston 99. This groove cooperates with a fixed boss or pin 125 to prevent rotation of the piston within the bore 98, thereby maintaining the relative angular orientation of the horizontal piston slot 121. In the quiescent condition depicted in FIG. 6, the slot 121 is aligned with a cross pin 123. In this condition, an increase in fluid pressure in the chamber 100 can force the piston rightwardly compressing spring 101 and increasing the chamber 100 volume, i.e., the chamber provides its normal accumulator function. With this rightward piston motion, the slot 121 moves freely along the pin 123. From the rest state shown in FIG. 6, energization of the solenoid 111 causes armature 113 to begin upward travel from the position shown in FIG. 8*a*, raising link 117 and spreading the toggle linkages 105 and 107 away from one another. Here the different behavior of this linkage arrangement surfaces. Spring 101 is sufficiently resistant to compression to prevent initial rightward motion of piston actuator 103 as well as preventing entry of the pin 123 into slot 121. Instead, the off-center pivotal coupling of the link 105 to the actuator causes the actuator 103 to rotate clockwise as indicated by the arrow from the position shown in FIG. 8*a* to that shown in FIG. 8*b* misaligning the pin 123 and slot 121. Now further upward armature motion causes the actuator 103 and piston 99 to move in unison leftwardly in the bore reducing chamber 100 volume and supplying pressure fluid to the braking system.

In FIG. 6, the ABS and fast fill fluidic functions are accomplished by piston 99 and piston actuator 103. The low pressure accumulator function is accomplished as fluid enters the chamber from the left end and the spring 97 loaded piston 99 moves to the right. The fast fill function is accomplished by energization of the solenoid 111 which causes the solenoid armature 113 to move upward, further causing the toggle arms 105 and 107 to expand angularly away from one another and pushing upon the pivot attachment point of the piston actuator 103. This causes the piston actuator 103 to rotate so that the piston actuator cross pin 123 does not align with the previously corresponding slot in the piston. Further expansion of the toggle arms causes the piston actuator to move to the left and push the piston to the left, thus fast displacing fluid out of the chamber into the brake system. In the fast fill apply position of the toggle (at rest position shown in FIG. 6), the toggle angularity is geometrically favorable that high pressure acting, upon the piston will not cause high forces on the solenoid armature. This toggle arrangement/position is again very similar to that seen in FIG. 4.

What is claimed is:

1. A vehicle hydraulic braking system having an operator actuable fluid pressure source and at least one hydraulic circuit including, for each braked wheel, a brake actuator, a normally open solenoid actuable apply valve for supplying pressure fluid from a master cylinder to the actuator during normal braking, and a normally closed solenoid actuable decay valve for venting pressure fluid from the actuator during an antilock event; each hydraulic circuit including an accumulator for receiving and temporarily storing pressure fluid from the actuator during an antilock event, characterized by an improved accumulator having a solenoid and solenoid actuable piston energizable upon initial operator actuation of the fluid pressure source to supply a charge of pressure fluid from the accumulator by way of the normally open apply valve to the associated brake actuators.

2. The braking system of claim 1, wherein the accumulator includes a piston reciprocable along an accumulator axis between a filled position during an antilock event and an empty position after supplying a charge of pressure fluid to a brake actuator, and having an intermediate rest position.

3. The braking system of claim 2, wherein the accumulator solenoid includes an armature reciprocable from a rest position to an enabled position along a solenoid axis positioned orthogonal to the accumulator axis.

4. The braking system of claim 1, wherein the accumulator solenoid includes an armature reciprocable along a solenoid axis from a rest position where the accumulator is prepared to perform the function of receiving and temporarily storing pressure fluid from an actuator during an antilock event toward an enabled position supplying a charge of pressure fluid from the accumulator to a brake actuator.

5. The braking system of claim 4, wherein the accumulator includes a piston reciprocable along an accumulator axis between rest position and an empty position after supplying a charge of pressure fluid to a brake actuator.

6. The braking system of claim 5, wherein the solenoid and piston axes extend generally perpendicular to one another.

7. The braking system of claim 6, wherein the accumulator further includes a sleeve disposed generally concentrically about the piston, a coil spring intermediate the sleeve and piston for resiliently biasing the sleeve and piston axially away from one another, a locking mechanism operable upon axial piston motion to prevent axial sleeve motion, the sleeve being movable axially to compress the spring allowing the accumulator to receive pressure fluid during an antilock event.

8. The braking system of claim 4, wherein the accumulator includes a piston reciprocable along an accumulator axis which extends generally perpendicular to the solenoid axis.

9. The braking system of claim 8, further including a toggle linkage mechanism coupling the solenoid armature and piston to move the piston and discharge pressure fluid upon solenoid energization.

10. The braking system of claim 9, wherein the toggle linkage mechanism includes a toggle arm coupled to the piston and provides an output force $F_p$ on the piston along the accumulator axis in response to an input force $F_s$ from the solenoid armature along the solenoid axis related by $F_s = 2F_p \tan á$ where the angle between the toggle arm and the accumulator axis is á.

11. The braking system of claim 9, wherein the toggle linkage mechanism provides an output force $F_p$ on the piston along the accumulator axis in response to an input force $F_s$ with a mechanical advantage $F_p/F_s$ which is substantially greater than one.

12. The braking system of claim 9, wherein the toggle linkage mechanism further includes a piston actuator executing initial rotation followed by axial motion to move the piston upon solenoid energization.

13. The braking system of claim 12, wherein the piston actuator is coupled to the remaining toggle linkage mechanism at a location displaced from the accumulator axis.

14. A brake fluid accumulator operable in a passive mode to receive fluid from and return fluid to a vehicle braking system, and operable in an active mode to supply an initial shot of pressurized fluid to the vehicle braking system upon initial operator actuation of the braking system, comprising:
- a housing having a cylindrical bore;
- a piston assembly reciprocably received in the housing bore and defining in conjunction with the bore, a variable volume chamber;
- a resilient spring biasing the piston assembly in a direction to diminish the chamber volume;
- a chamber inlet for receiving pressure fluid from a vehicle braking system and for expelling pressure fluid from the chamber to the vehicle braking system;
- a solenoid having an armature movable along a solenoid axis in response to solenoid energization; and
- a mechanical coupling between the solenoid armature and the piston assembly operable to transmit armature motion induced by solenoid energization to the piston assembly expelling pressure fluid from the chamber to the vehicle braking system.

15. The brake fluid accumulator of claim 14, wherein the piston assembly is reciprocable within the bore along a bore axis disposed generally orthogonally to the solenoid axis.

16. The brake fluid accumulator of claim 15, wherein the mechanical coupling comprises a toggle linkage mechanism including a toggle arm coupled to the piston assembly which provides an output force $F_p$ on the piston assembly along the bore axis in response to an input force $F_s$ from the solenoid armature along the solenoid axis related by $F_s = 2F_p \tan á$ where the angle between the toggle arm and the accumulator axis is á.

17. The brake fluid accumulator of claim 15, wherein the mechanical coupling provides an output force $F_p$ on the piston assemble along the bore axis in response to an armature induced input force $F_s$ along the solenoid axis with a mechanical advantage $F_p/F_s$ which is substantially greater than one.

18. The brake fluid accumulator of claim 14, wherein the piston assembly comprises a generally cylindrical sleeve disposed in the bore and a reciprocable piston coaxially received in the sleeve, the piston moveable within the sleeve under urging of the armature to expel pressure fluid from the chamber to the vehicle braking system.

19. The brake fluid accumulator of claim 14, wherein the piston assembly is reciprocable within the bore along a bore axis and comprises a single piston, the mechanical coupling comprising a toggle linkage mechanism and a piston actuator reciprocably disposed within the bore axially adjacent to the piston, the actuator and piston movable together in response to armature movement, and the piston movable axially toward the actuator in response to a fluid ingress induced increase in chamber volume.

* * * * *